April 26, 1960 G. W. YARBER 2,934,616
INERTIAL MECHANISM FOR BRAKE CONTROL
Filed Sept. 4, 1958 3 Sheets-Sheet 1
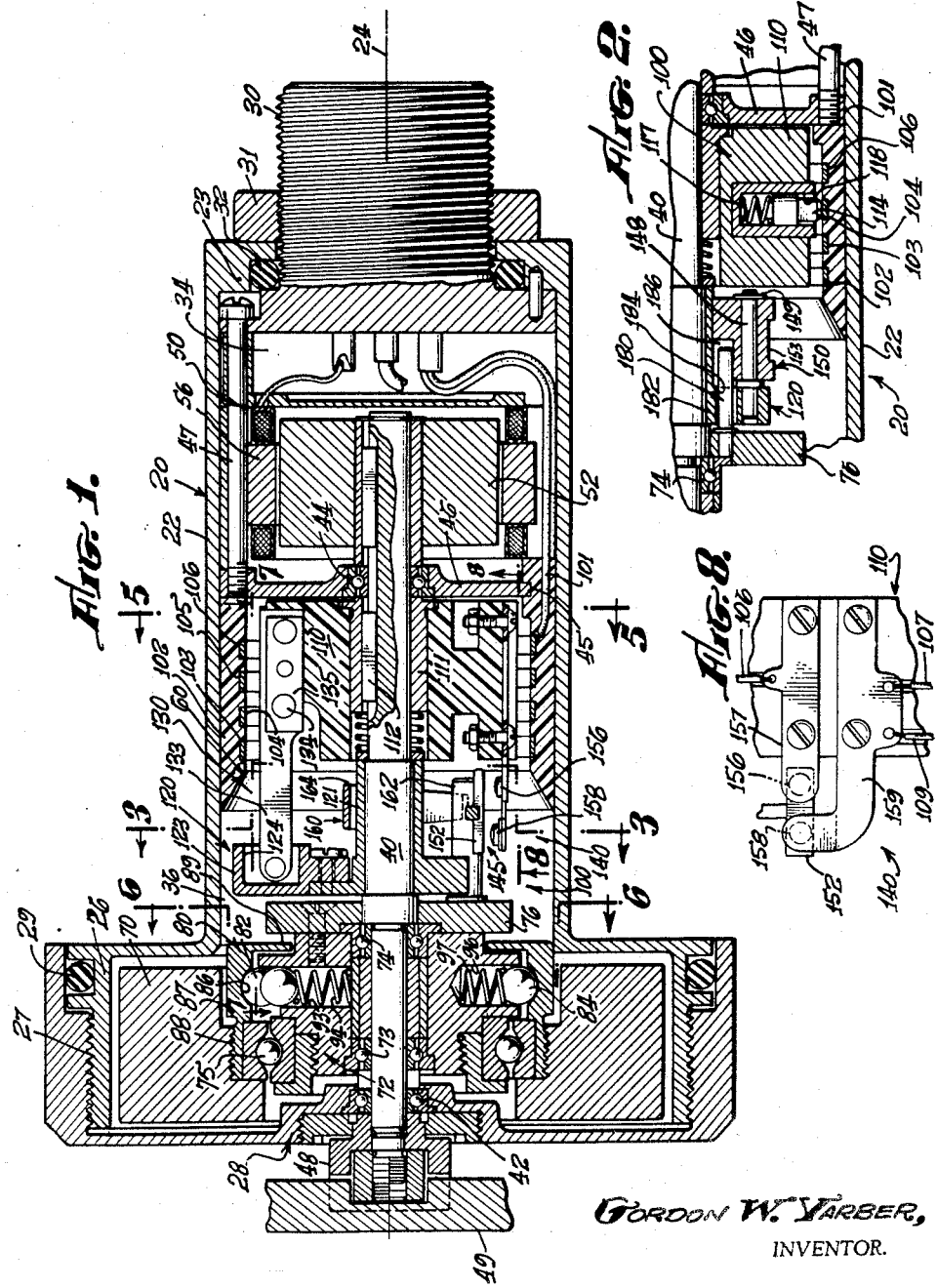
Gordon W. Yarber,
INVENTOR.
BY
Barlelew + Lewis April 26, 1960  G. W. YARBER  2,934,616
INERTIAL MECHANISM FOR BRAKE CONTROL
Filed Sept. 4, 1958  3 Sheets-Sheet 2
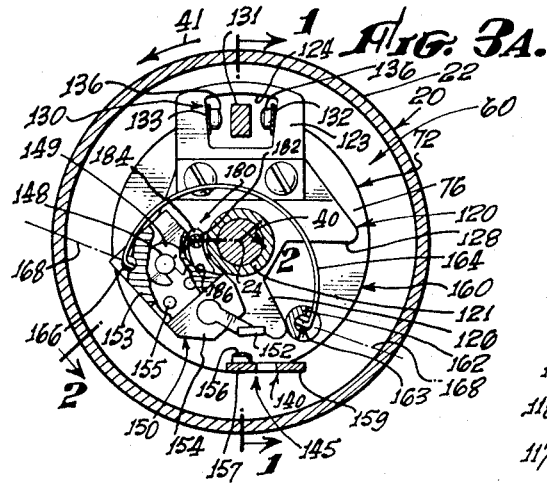
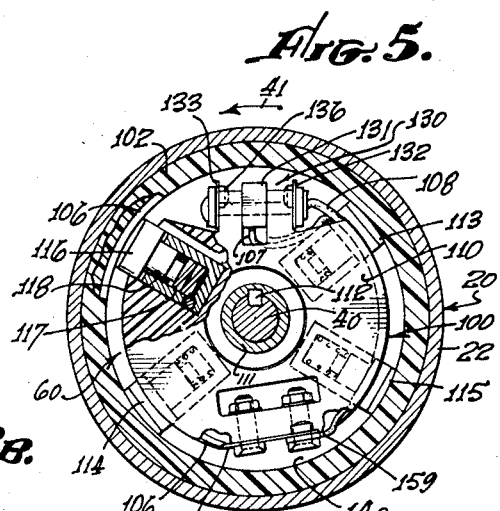
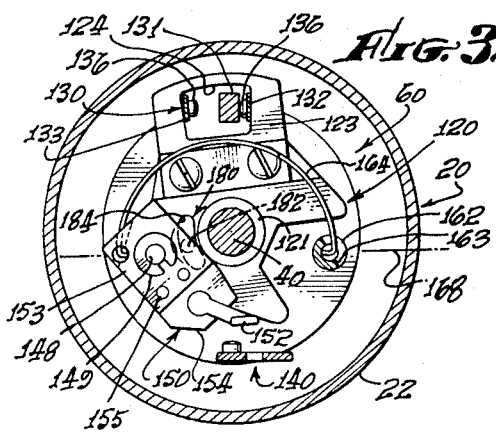
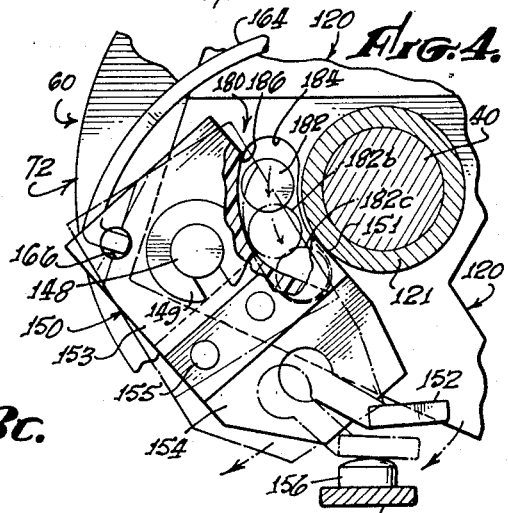
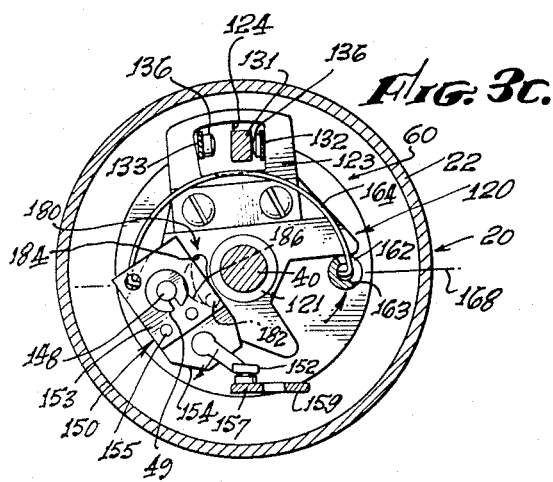
GORDON W. YARBER,
INVENTOR.
BY
Barthelew & Lewis

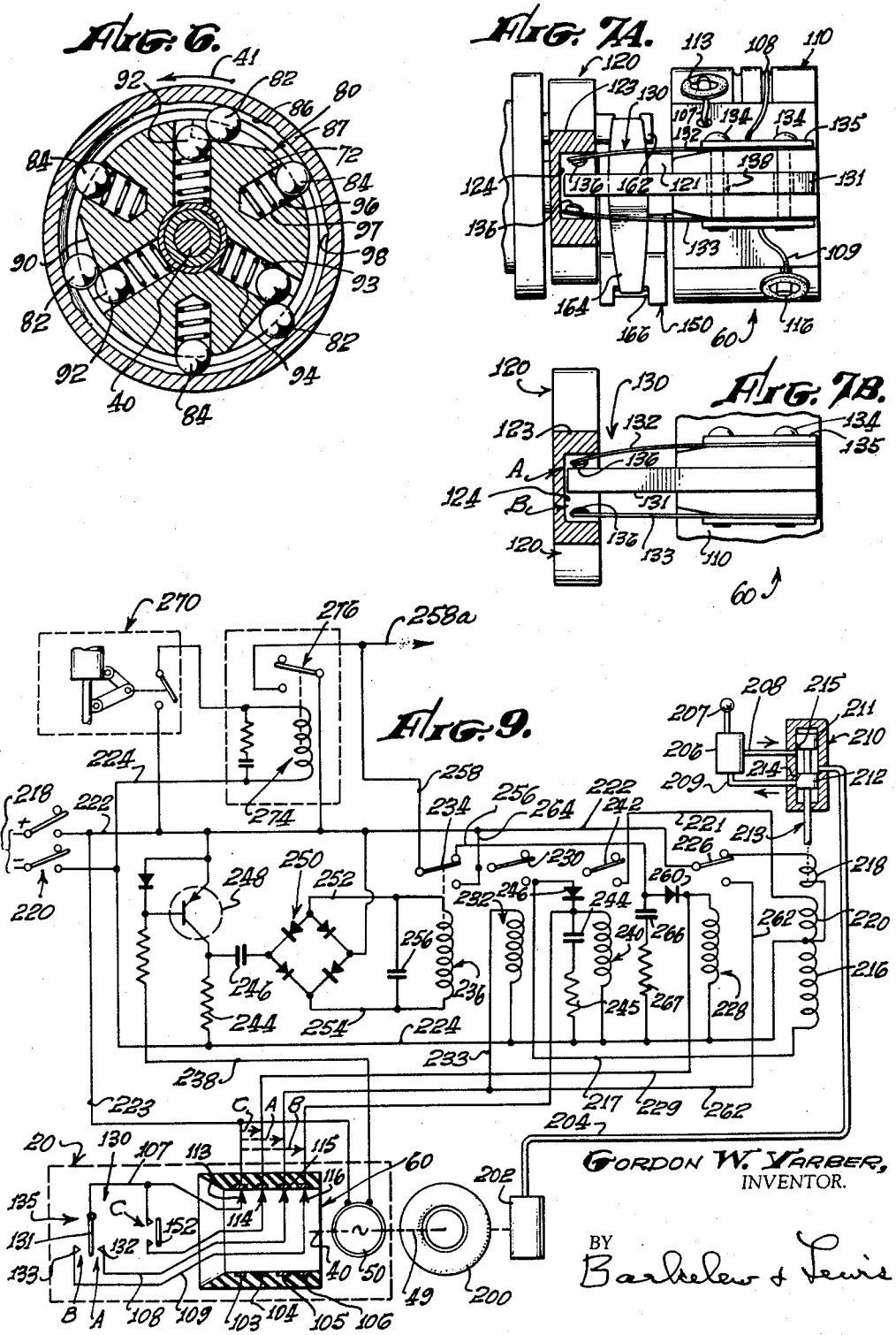

United States Patent Office 2,934,616
Patented Apr. 26, 1960

2,934,616

INERTIAL MECHANISM FOR BRAKE CONTROL

Gordon W. Yarber, Cornell, Calif.

Application September 4, 1958, Serial No. 759,004

14 Claims. (Cl. 200—61.46)

This invention has to do with improved mechanism for sensing changes in rate of rotation of a rotary member.

The invention is concerned more particularly with such mechanisms which are adapted for incorporation in systems for the control of vehicle wheel brakes to prevent skidding of the braked wheel and to obtain more effective braking action.

The invention relates more particularly to sensing mechanisms which utilize a rotary inertial member driven in accordance with the wheel rotation by means of a yieldable coupling which develops one or more electrical signals in response to abnormal wheel deceleration. Such signals may be employed in any desired manner to relieve the brake until the wheel resumes normal rotation.

Most previous deceleration sensing mechanisms of flywheel type for operating an electrical switch have required a relatively large flywheel in order to provide fully adequate torque to maintain reliable switch contact under all operating conditions. The present invention has the advantage of producing switch operation in such a way that it can be maintained reliably with a minimum of flywheel-derived energy. That is accomplished by providing an over-center type of switch actuation in which a switch member is shifted by snap action between open and closed switch conditions. That type of mechanism has the great advantage that, once the switch has been closed, for example, as by an abnormal condition of wheel deceleration, the force which is effective to maintain switch contact is positively determined by the mechanism itself. The switch is therefore held closed in a fully reliable manner until the rate of wheel deceleration reaches the predetermined value at which the switch is set to positively open. Until that value is reached, the switch contacts are engaged with a uniform pressure that does not gradually decrease as the wheel deceleration approaches the critical release value. That type of operation not only is far more reliable, but has been found to require less energy from the flywheel, thus permitting the flywheel to be either smaller in diameter or lighter in weight, or both. That is particularly advantageous in systems for use in aircraft.

The invention further provides an over-center switch-actuating mechanism which includes novel locking structure for insuring reliable operation and for preventing spurious operation in either direction under such abnormal conditions as excessive linear accelerations.

A further aspect of the invention relates particularly to sensing mechanism for use in control systems in which two or more stages of brake relief are provided. Such systems may, for example, arrest brake application in response to a first degree of wheel deceleration; and release the brake in response to a second and more severe degree of wheel deceleration. The two degrees of wheel deceleration to which such a system is responsive may differ, for example, in absolute rate or in the time period during which an excessive rate of deceleration is maintained, or in some combination of two such factors.

The present invention provides mechanism which is particularly convenient and effective for providing two successive signals in response to distinct degrees of wheel deceleration. A particular feature of the present mechanism is that the two signals are developed in response to yielding of two distinct portions of the mechanism which are connected in such a way that yielding of the portion that controls the second signal can take place only after yielding of the first portion has been completed to the point of development of the first signal. With that arrangement, the effective spring rate for the first yielding coupling may be as small as may be desired, and the rate for the second coupling may be as large as may be desired, since the two act substantially independently of each other.

A further aspect of the present invention provides improved inertial mechanism for developing a control signal in response to a predetermined degree of wheel deceleration of a particular type. Such a degree of wheel deceleration is one in which the value of the wheel deceleration not only exceeds a predetermined critical value, but continues to exceed such a value for an appreciable and substantially predetermined time period.

The invention further provides particularly effective and economical means for coupling the flywheel to the signal developing mechanism. That coupling means embodies an overrunning clutch and a torque limiting mechanism, both of which embody unique improvements.

A full understanding of the invention, and of its further objects and advantages, will be had from the following description of a typical manner in which it may be carried out. That description, including the accompanying drawings which form a part of it, is intended only as illustration and not as a limitation upon the scope of the invention, which is defined in the appended claims.

In the drawings:

Fig. 1 is an axial section representing an illustrative embodiment of the invention;

Fig. 2 is a fragmentary axial section on line 2—2 of Fig. 3A;

Fig. 3A is a transverse section on line 3—3 of Fig. 1, showing the mechanism in normal position;

Fig. 3B is a section corresponding to Fig. 3A but showing the mechanism partially actuated;

Fig. 3C is a section corresponding to Fig. 3A, but showing the mechanism fully actuated;

Fig. 4 corresponds to a portion of Fig. 3A at enlarged scale;

Fig. 5 is a transverse section on line 5—5 of Fig. 1;

Fig. 6 is a transverse section on line 6—6 of Fig. 1;

Fig. 7A is a fragmentary section on line 7—7 of Fig. 1;

Fig. 7B corresponds to Fig. 7A, but shows the parts in an operating position;

Fig. 8 is a fragmentary section on line 8—8 of Fig. 1; and

Fig. 9 is a schematic diagram representing an illustrative brake control system embodying the invention.

The illustrative device to be described comprises an acceleration sensing mechanism which is responsive to changes in rate of wheel rotation, and a rotation sensing mechanism which distinguishes between presence and substantial absence of wheel rotation. Those two sensing mechanisms are mounted in a common housing, denoted generally by the numeral 20. Housing 20 comprises a cylindrical shell member 22 with a radially inner flange 23 at its inner end and a radially expanded portion 26 at its outer end. The cylindrical axis of shell member 22 is indicated at 24. The outer end of the housing is closed by a cover member 28, secured by threads 27 and provided with sealing means shown as the O-ring 29. The inner end of the housing is closed by the body of the electrical connector 30, which is retained by flange 23 and a nut 31, and which is sealed by the O-ring 32. Housing 20 is typically mounted in any convenient manner in fixed relation to the structure that supports the wheel bearing and preferably in coaxial relation to the wheel to be braked.

A main shaft 40 is journaled coaxially of housing 20 by the outer bearing 42, carried by cover member 28, and the inner bearing 44, carried by the bearing support ring 46. That frame ring is fixedly mounted within the housing by the screws 47. Ring 46 divides the interior of housing 20 into an inner chamber 34 containing the rotation sensing mechanism 50 and an outer chamber 36 containing the acceleration sensing mechanism 60. The outer end of shaft 40 carries a fitting 48 for connection of any suitable driving mechanism, which may typically be a bracket, indicated at 49, which is mounted directly on the wheel to be braked. Fitting 48 and bracket 49 represent any suitable mechanism for driving shaft 40 at any fixed speed ratio in accordance with the wheel rotation. The direction of shaft rotation that corresponds to forward wheel rotation is counterclockwise as viewed from the inner end of the present structure, that is, as indicated by the arrows 41 in Figs. 3, 5, and 6. The present unit is thus adapted for mounting on the outboard side of a righthand wheel of an aircraft, for example, a corresponding unit adapted for opposite rotation being typically provided for the corresponding lefthand wheel.

Rotation sensing mechanism 50 comprises an alternator having a rotating permanently magnetized field structure 52 fixedly mounted on the inner end of shaft 40 inward of bearing 44, and an armature winding structure 56 which is fixedly mounted with respect to housing 20. Alternator 50 produces an effective alternating current signal in the armature winding in response to wheel rotation in either direction at a speed that exceeds approximately 15 r.p.m., for example.

The present invention is concerned more particularly with certain features of acceleration sensing mechanism 60. That mechanism is of the type which utilizes a rotary inertial element, typically a flywheel, driven from shaft 40 by a mechanism which includes a yielding linkage structure. That structure yields in response to a driving torque that exceeds a predetermined critical value. Yielding of that linkage structure produces one or more electrical signals, typically by closure of suitably arranged switch contacts, and those electrical signals are utilized to actuate the brake controlling mechanism. The flywheel driving mechanism preferably includes also an overrunning clutch mechanism that limits the maximum torque that can be transmitted between the flywheel and the shaft in the direction tending to decelerate the flywheel, but which provides effectively positive drive of the flywheel in the forward direction.

In the present illustrative embodiment the inertial element comprises the flywheel 70, mounted near the outer end of shaft 40 within the expanded portion 26 of housing 20. The flywheel is mounted by means of a flywheel hub member 72 which is journaled with respect to the shaft by the two ball bearings 73 and 74. A normal rotary position of hub member 72 with respect to shaft 40 is defined by yielding switch-control means to be described. The flywheel is journaled in turn with respect to hub member 72 by the single ball bearing 75. Rotation of the flywheel relative to the hub member is controlled by the overrunning clutch 80.

In the present embodiment, clutch 80 comprises two sets of balls 82 and 84 which control primarily the forward and the rearward acceleration, respectively, of the flywheel (Fig. 6). Balls 82 will be referred to for convenience as locking balls, since they typically provide a positive driving connection in the forward direction; and balls 84 will be referred to as torque balls, since they permit rearward slipping of the shaft relative to the flywheel when the torque between the two members exceeds a predetermined value. The balls of both sets engage a common race 86, which is formed on the inner face of the clutch ring 87. Ring 87 is fixedly mounted by the threads 88 on flywheel 70 and forms an axially extending flywheel flange. The portion of ring 87 adjacent threads 88 acts as support and retainer for the outer race of ball bearing 75. An inwardly extending radial sealing flange 89 on ring 87 substantially seals off the clutch structure 80 and flywheel bearing 75 from the inner portion of housing chamber 36.

Locking balls 82 are mounted in respective tapering channels 90, formed in the periphery of hub member 72, and are yieldingly urged toward the constricted portion of those channels by the action of the spring-urged pressure balls 92. Pressure balls 92 are received in the radial bores 93 which are circumferentially distributed in hub member 72, and are spring-pressed outwardly into oblique engagement with locking balls 82 by the coil springs 94. Those springs are relatively light, since only a slight force is required to maintain locking balls 82 in contact with both channel 90 and race 86. Channels 90 taper in the direction of rearward rotation. Locking balls 82 therefore become wedged in the channels, with the aid of pressure balls 92 whenever hub member 72 tends to turn forward faster than flywheel 70, forming an effectively positive driving connection for accelerating the flywheel.

Torque balls 84 are received in radial bores 96, circumferentially distributed in hub member 72, and are yieldingly urged outward into direct engagement with race 86 by the coil springs 97. Those springs are relatively strong, and act upon the torque balls with sufficient force that appreciable friction is produced in response to relative rotation of the flywheel and hub member in either direction. That friction tends to prevent such relative rotation. It is utilized in practice only in the direction of rearward movement of the hub member relative to the flywheel, since forward movement is positively prevented by the action of locking balls 82, already described. The resistance of torque balls 84 to rearward rotation of the hub member relative to the flywheel is preferably further enhanced and controlled by providing circumferentially spaced depressions in the surface of race 86. Such depressions are typically shown at 98 in Fig. 6, in which, however, the depth of the depressions is considerably exaggerated for clarity of illustration. In actual practice each depression 98 is only approximately 0.002 to 0.010 inch deep, less than one tenth the diameter of torque balls 84. Each depression 98 has a curved surface, the radius of curvature of that surface being between about one and about two times the radius of the torque balls 84. Depressions 98 may be formed conveniently with a grinding wheel of suitable diameter somewhat larger than those balls. Depressions 98 are preferably uniformly distributed about the race 86, but at an angular spacing that is not commensurate with the spacing of the torque balls. For example, the number of depressions 98 may be one greater than the number of torque balls, or one greater than some integral multiple of the number of balls. The number of depressions is small enough that they occupy only a small proportion of the circumference of race 86, for example less than ten percent. In the present instance three torque balls are provided, and seven depressions. With that type of arrangement, only one ball can encounter a depression at a time, and the maximum angle through which the hub member can rotate relative to the flywheel before a torque ball encounters a depression is made much smaller than the angular spacing between adjacent balls. For example, with the illustrative spacing described, the depressions are about 51.4° apart and the torque balls 120° apart, yet a ball encounters a depression about every 17° of relative rotation of the parts. If locking balls 82 are included, the number of such encounters is doubled.

I have found that the described type of irregularity in the surface of the ball race is particularly desirable for producing an effectively uniform and relatively large frictional torque between two relatively rotating members with minimum wear of the parts. A primary function of permitting relative rotation of the flywheel and hub member is to avoid unnecessarily slowing the flywheel rotation in response to rapid wheel deceleration. However, torque balls 84 and their associated structure permit such relative rotation only in response to a torque that exceeds the value required for operating the signalling apparatus to be described. Hence, during typical operation of that apparatus overrunning clutch 80 ordinarily acts as a positive driving connection between the flywheel and the hub member. For convenience of description, the overrunning clutch will be so considered, except where its slipping action is specifically under consideration.

Flywheel hub member 72 is rotatively related to shaft 40 by means of a yielding mechanism, indicated generally by the numeral 100, which defines a normal mutual rotary position of those elements and permits limited departure from that relation in response to a torque which exceeds a predetermined value. Yielding mechanism 100 comprises the driving hub 110, fixedly mounted on shaft 40, and the switch carrier 120, which is rotatably mounted on shaft 40 by means of the bushing portion 121. Driving hub 110 and switch carrier 120 are rotatively related by means of yielding structure 130 to be described, which comprises a first switch mechanism and which develops a first deceleration signal in response to a relatively small applied torque. Switch carrier 120 and flywheel hub 72 are rotatively related by means of yielding structure 140, which comprises a second switch mechanism and develops a second deceleration signal in response to a torque which is typically larger in magnitude or longer in duration, or both, than the first torque, just mentioned. If the first deceleration signal is not required, many advantages of the present invention may still be obtained. Under that condition, the switch carrier may be fixedly mounted on shaft 40, and may, for example be rigidly connected to driving hub 110. However, it is preferred to provide both electrical signals, and the invention will be described illustratively in a form in which that is done. In the present embodiment first switch mechanism 130 also provides an electrical signal in response to acceleration of driving hub 110.

Driving hub 110 is preferably formed of electrically insulating material, and is mounted on shaft 40 by means of the metal bushing 111, which may be assembled with the hub by a press fit. The hub and bushing are locked against rotation with respect to the shaft, as by the key 112. Driving hub 110 typically serves also as a housing for four brushes 113, 114, 115, and 116, which are mounted in respective radial bores 118 and are yieldingly urged radially outward by the coil springs 117 (Figs. 2 and 5). Those brushes engage the respective axially spaced slip rings 103, 104, 105, and 106, fixedly mounted with respect to housing shell 22, and provide electrical connection between the two switch mechanisms to be described and the control equipment. As shown, the slip rings are embedded in an inner sleeve 102 of insulating material, which is cast integrally with the metal frame plate 46. The periphery of that plate is typically notched between the threaded holes for screws 47, as seen as 45 in the lower part of Fig. 1. Electrical connection to the slip rings from connector 30 may comprise flexible leads, as indicated at 101.

First switch mechanism 130 comprises a central switch arm 131 and two outer switch arms 132 and 133 (Fig. 7). The arms have one end fixedly mounted on driving hub 110, as by the rivets 134 and plates 135, and extend axially therefrom in mutually spaced parallel relation in a common plane. Outer arms 132 and 133 are flexible in their common plane, whereas central arm 131 is effectively rigid. Contact formations 136 are provided on the inner faces of arms 132 and 133 adjacent their free ends and in position to make electrical contact with central arm 131 in response to inward deflection of the outer arms. Arms 131 and 132 will be considered to comprise a switch A, and arms 131 and 133 comprise a switch B. Central arm 131 is electrically connected to brush 113 and thereby to slip ring 103, as by the wire indicated at 107 (Fig. 5). Outer arm 132 is electrically connected via the wire 108 to brush 115 and thereby to slip ring 105. Outer arm 133 is electrically connected via the wire 109 to brush 116 and to slip ring 106. Rivets 134 are insulated from outer arms 132 and 133, as well as from central arm 131, as by providing clearance holes and insulating washers.

The outer ends of the three switch arms 131, 132, and 133, are received between two stop formations, fixedly carried by switch carrier 120. As shown, a switch housing 123 of insulative material is fixedly mounted on carrier 120 and forms a cavity 124 which partially encloses the free ends of the three switch arms. As shown best in Fig. 7A, outer switch arms 132 and 133 normally yieldingly engage the opposing walls of cavity 124, which thus constitute the stop formations just referred to. Arms 132 and 133 are thereby flexed slightly toward central switch arm 131. Relative rotation of switch carrier 120 with respect to driving hub 110 causes further flexing of one or other of the flexible switch arms, causing the central relatively rigid arm 131 to engage one or other of their contact formations 136. For example, during deceleration of shaft 40 and driving hub 110, carrier 120 tends to rotate forwardly with respect to the hub (counter-clockwise as seen in Figs. 3 to 6), thus deflecting switch arm 132 and causing it to contact central arm 131 as shown in Fig. 7B, closing switch A. Shaft acceleration similarly tends to deflect switch arm 133, closing switch B.

As soon as one of contact formations 136 has been engaged by central switch arm 131, further relative rotation of driving hub 110 and switch carrier 120 is positively prevented, and those two elements may be considered for the moment to be fixedly related, at least so far as continuing rotation in the same direction is concerned. If the applied torque that produced that rotation ceases, resilient action of the deflected switch arm normally restores the elements to normal relative rotational position, with central arm 131 spaced between contact formations 136, as in Fig. 7A, for example. Reversal of the direction of that torque typically causes the elements to pass rapidly through that normal position, deflecting the other flexible switch arm into electrical contact with central arm 131. Further relative rotation of the driving hub and switch carrier is then again positively prevented. The total range of permitted mutual rotation of the driving hub and switch carrier is only that required to move the outer end of central arm 131 from engagement with one outer switch arm to engagement with the other, and is thus determined in part by the width of cavity 124 in the circumferential direction, that is, as seen in Fig. 7B. That rotational movement may be given substantially and desired value by suitable proportioning of the parts. It may, for example, be about 10°, so that switch closure occurs in response to relative rotation through 5° in either direction from normal position. For clarity in describing the second switch structure, switch carrier 120 may be considered to be rotationally fixed with respect to shaft 40.

Second switch structure 140 comprises a switch member 150 which is pivotally mounted on switch carrier 120 by means of the pivot pin 148. Pin 148 is fixedly mounted, as by a press fit, in carrier 120 parallel with main axis 24 and radially offset therefrom (Figs. 2 and 3). Switch member 150 is freely rotatable on pin 148, on which it is retained by the snap ring 149. Switch member 150 carries a switch blade 152 which is fixedly mounted in insulated relation, as by the bracket portion 154 of the switch member. Bracket portion 154 in the present embodiment is formed of insulating material and is mounted on the body 153 of switch member 150 by the pins 155.

Switch blade 152 cooperates with two switch contacts 156 and 158, together forming the switch C. Contacts 156 and 158 are mounted in the present embodiment on driving hub 110. They are electrically connected, as by the lines 106 and 109 (Figs. 5 and 8) to the respective brushes 114 and 115 and thereby to the slip rings 104 and 105. Switch contacts 156 and 158 are axially spaced and are carried by the respective circumferentially spaced switch arms 157 and 159, arm 159 having an offset portion at its end, as shown best in Fig. 8. Arms 157 and 159 are preferably slightly resilient in a generally radial direction to insure effective engagement of both contacts by blade 152. In normal position of the apparatus, switch blade 152 is spaced radially inward of the two switch contacts 156 and 158 (Figs. 3A and 3B), and is movable into engagement with those contacts by rotation of switch member 150 in a clockwise direction to the position shown in Fig. 3C. Blade 152 is wide enough in the circumferential direction about shaft 40 to insure effective switch closure throughout the small range of permitted rotation of switch carrier 120 relative to driving hub 110, already described. The angular position of switch member 150 is typically defined in actuated position by engagement of the switch contacts themselves; and in normal position by any suitable stop means, as by direct contact at 151 of the switch member with bushing portion 121 of switch carrier 120 (Fig. 4).

That movement of switch member 150 is controlled in a novel manner by the relative rotation of switch carrier 120 and flywheel hub 72. That relative rotation ordinarily corresponds substantially to relative rotation of flywheel 70 and shaft 40, since the flywheel is rotationally related to hub 72 in the manner already described, and switch carrier 120 is rotatively fixed to shaft 40 except for the relatively slight and positively limited play permitted by first switch mechanism 130, already described. The relative rotation of switch carrier 120 and flywheel hub 72 is positively limited to a definite angular range, shown as approximately 30°, by a stop means of any suitable type. As shown, the pin 162 is fixedly mounted on flywheel hub 72 by means of mounting disk 76 and engages the stop jaws 126 and 128 which are formed as integral parts of switch carrier 120 (Fig. 3). Stop pin 162 engages stop jaw 126, as shown in Fig. 3A, in normal position of the apparatus, and is shiftable into engagement with stop jaw 128, as in Fig. 3C, in response to abnormal shaft deceleration.

The operating mechanism for switch member 150 comprises an over-center spring mechanism, indicated generally by the numeral 160, and a positive control mechanism, which acts on a cam principle and is indicated generally by the numeral 180. Spring mechanism 160 comprises a spring 164 which acts in the common plane of two spring supports fixedly mounted with respect to switch member 150 and to flywheel hub 72, respectively. Those spring supports are so located that their common plane is closely spaced on opposite sides of switch pivot pin 148 at the respective ends of the angular range of relative movement of switch carrier 120 and flywheel hub 72. The direction of spring action on the spring support on switch member 150 is generally toward pivot pin 148. The two spring supports are preferably positioned on opposite sides of that pivot pin, with the spring acting in tension.

In the present embodiment, the supports for spring 164 comprise a channel formation 163 formed near the end of pin 162, already described as fixedly mounted on flywheel hub 72, and a channel 166 formed directly in switch member 150. Spring 164 comprises a strip of sheet spring material formed into substantially a semicircle with its ends bent radially inward and resting in the respective channels 163 and 166. Each of those channels may conveniently be formed by drilling a small hole in an axial direction at substantially the desired point of application of the spring force, and then cutting away the material at one side of the hole to provide an aperture for access of spring 164 to the cylindrical wall of the hole on the other side. By limiting the axial length of the access aperture, the axial position of spring 164 may be positively defined.

Spring supporting formations 163 and 166 define a plane parallel to main axis 24, which plane is indicated by the numeral 168 in Figs. 3A, 3B, and 3C. In normal position of the device, that plane passes below the axis of switch pivot pin 148. In that position, the resultant torque exerted by spring 164 upon switch member 150 about pivot 148 is counterclockwise as seen in Fig. 3A, for example, holding second switch C open. Counterclockwise rotation of flywheel hub 72 through a predetermined critical angle relative to switch carrier 120, as during abnormal wheel deceleration, causes plane 168 to pass through the axis of pivot pin 148, as in Fig. 3B, at which position the resultant torque exerted on switch member 150 is zero. Further relative rotation of hub 72 and carrier 120 produces a clockwise torque on switch member 150, which is thereby driven rapidly by a snap action to switch actuating position, as shown in Fig. 3C.

That switch actuation occurs in response to forward rotation of flywheel hub 72 relative to shaft 40 from the normal position of Fig. 3A through an actuating angle which is substantially equal to the maximum angular movement of pin 162 between stop jaws 126 and 128. More precisely, the true actuating angle is different from that stop-limited angle for two reasons. Firstly, the actuating angle includes the angle required to close first switch 135 and bring shaft-mounted arm 131 into driving relation with switch carrier 120, as already described. Secondly, second switch 145 is actuated at some rotational position of pin 162 relative to switch carrier 120 which is intermediate the neutral position of Fig. 3B and the fully actuated position of Fig. 3C. Those two corrections substantially cancel out in the present embodiment, so that the angular movement of pin 162 between stop jaws 126 and 128 actually corresponds substantially to the switch actuating angle. That angle is typically of the order of 30°, but may be varied by suitable modification of the structure to give the desired detailed action.

In the present embodiment, the radial distance from switch pivot 148 to spring supporting formation 166 on switch member 150 is considerably smaller than the average distance from switch pivot 148 to the other spring supporting formation 163 on flywheel hub 72. That relation has the useful results that the angular movement of switch member 150 between open and closed positions of switch 145 causes relatively little change in the position of plane 168 and hence of the several functions performed by the spring; and that the effective change in spring length is a small fraction of its average length.

The single spring means, represented in the present embodiment by the spring 164 and its supporting structure, not only operates second switch 145 in the manner just described, but also provides a yielding torque of a particularly desirable type between switch carrier 120 and flywheel hub 72. In considering that aspect of the spring function, it is convenient to consider switch member 150 to be a unitary part of switch carrier 120, whether it is in normal or in actuated position. In normal switch position the plane 168 of spring action lies below main axis 24 as seen in Fig. 3A, for example. The forces exerted by the spring on its respective supporting formations therefore produce a torque between the members on which those supports are carried which tends to hold pin 162 in engagement wtih stop jaw 126. The value of that torque may be expressed as the product of the spring force acting in plane 168 by the vertical distance from that plane to main axis 24. By suitable design of the parts, including in particular the spring constant and degree of prestressing, that yielding torque in normal position of the device can be given any desired predetermined value. Counterclockwise movement of pin 162 away from stop jaw 126, therefore requires an opposite torque sufficient to overcome that predetermined value. That opposite torque may be considered to determine the critical rate of flywheel deceleration below which second switch 145 cannot be operated.

If that critical value of flywheel deceleration is exceeded, which typically occurs only in response to an incipient skid of the braked wheel, pin 162 moves away from stop jaw 126 toward the positions of Figs. 3B and 3C. The torque exerted by the spring between flywheel hub 72 and switch carrier 120 is thereby altered in two primary respects. In the first place, plane 168 moves progressively closer to axis 24; and secondly, the force exerted by spring 164 in plane 168 becomes progressively greater as the spring is stretched. By appropriate design of the parts, those two effects can be made to produce a wide variety of functional relations between the relative movement of flywheel hub 72 and switch carrier 120. An illustrative relation, which is particularly desirable, is one in which the two effects mentioned substantially balance during the initial stages of movement of pin 162 away from stop jaw 126; and produce a rapidly decreasing torque as pin 162 approaches stop jaw 128. That decrease in torque may be considered to result from the rapid decrease in the distance of axis 24 from plane 168 as pin 162 reaches stop jaw 128, accompanied by only a slight increase in spacing between the two spring ends. That effect is increased by actuation of second switch 145, since the snap action of switch member 150 from open to closed position both shifts plane 168 closer to axis 24 and permits spring 164 to contract. However, both of those effects are preferably relatively slight, due to the relatively close spacing between spring support 166 and switch pivot 148, already mentioned.

An important feature of the present structure is the fact that plane 168 of the spring action remains always on the same side of main axis 24, so that the yielding torque exerted by the spring between flywheel hub 72 and switch carrier 120 is always in the same direction, tending to swing pin 162 into engagement with stop jaw 126 and thereby restore the parts to normal position as shown in Fig. 3A, for example. Hence, second switch 145 can remain closed only substantially as long as an opposite torque is supplied by deceleration of flywheel 70. As soon as the rate of flywheel deceleration decreases below a critical value, which corresponds to the torque produced by spring 164 in actuated position of the switch mechanism (Fig. 3C), spring 164 returns pin 162 toward normal position, causing a reverse snap action of switch member 150 which opens switch C. That critical value of flywheel deceleration for switch release is distinct from the critical value required to initiate switch actuation, and structure of the present general type can be designed to provide a wide variety of relations between those two values. In the present embodiment, as already indicated, the critical value of deceleration for switch release is considerably smaller, typically by a factor of as much as four, for example, than the critical value of deceleration for initiating switch actuation. That relation has the advantage that, once an incipient skid reaches the stage requiring brake release, the brakes are not again applied until the wheel deceleration has returned to a much smaller value. That relation is particularly valuable in systems that do not utilize two-stage control, such as is provided in the present embodiment; and in systems like the present one in which the critical value of deceleration for actuating the first stage (by closure of first switch 135 in the present instance), is intermediate between the critical values of deceleration for actuation and for release of the second stage of control (by closure of second switch C in the present instance).

The switch-actuating mechanism as so far described is fully satisfactory for many purposes. However, it is preferred, particularly for aircraft applications where the mechanism may be subject to high linear accelerations, to provide also positive control mechanism for positively preventing improper actuation or release of second switch C. That control mechanism is denoted generally by the numeral 180. It provides a cam type of switch control which prevents switch member 150 from snapping between open and closed positions when pin 162 is near either stop jaw 126 or 128; and which insures such movement, if for any reason it should not take place as a result of the spring action already described, in response to movement of pin 162 from one stop jaw to the other.

Mechanism 180 comprises a pin 182, which is fixedly mounted, like pin 162, on flywheel hub 72 by means of mounting disk 76; and a cam surface 186 which is carried by switch member 150, and is preferably formed directly thereon. Pin 182 extends axially through a clearance slot 184 in switch carrier 120, and its end portion engages cam face 186. As shown, pin 182 extends only part way through the thickness of switch member 150 (Fig. 1), and cam face 186 occupies only a corresponding part of the thickness of that member, the remainder being available to provide stop face 151, already mentioned, to engage sleeve 121 and define the normal position of the switch member.

As may be seen clearly in Fig. 3A (and in the solid lines in Fig. 4) cam face 186 is so formed that in normal position of the parts, its upper portion as seen in those figures is closely spaced from pin 182 in a direction that is circumferential with respect to switch pivot 148, so that rotation of the switch member to close switch C is positively prevented by cam engagement. As seen in Fig. 3B (and in 182b Fig. 4), when spring 164 is about to produce switch movement the portion of cam face 186 adjacent pin 182 is spaced therefrom in a direction that is radial with respect to switch pivot 148, and the cam therefore does not affect snap action of the switch in either direction. As seen in Fig. 3C (and at 182c in Fig. 4), in fully actuated position of switch C, the lower portion of cam face 186 as seen in that figure is closely spaced from pin 182 in a circumferential direction with respect to switch pivot 148, but in the opposite sense from that of Fig. 3A, so that appreciable movement of the switch member toward open position is positively prevented by cam engagement. The cam structure is preferably constructed in such a way as to avoid actual cam engagement in both idle and actuated positions of the mechanism, thus avoiding cam friction during normal operation; but the cam spacing in those positions is made small enough to prevent appreciable movement of the switch member away from those respective positions. Hence, although a momentary abnormal condition such as extreme linear acceleration of the entire unit may produce such slight movement, the switch member is positively prevented from moving far enough to carry it over center with respect to the spring mechanism 160. Therefore, as soon as the abnormal condition has ceased, the spring mechanism reliably returns the switch member to its proper position. Also, if for any reason the switch member should fail to perform the normal snap action already described in response to movement of spring supporting pin 162 from one stop jaw to the other, cam mechanism 180 positively moves the switch member in the direction of the proper snap action substantially to its proper final position. Under those conditions the mechanical advantage of the spring action becomes so high that completion of the switch movement reliably follows. Thus, cam mechanism 180 provides the valuable function of virtually insuring proper switch actuation and preventing its improper actuation in either direction, irrespective of any abnormal situation; and yet producing no frictional loading whatever of the operating parts during normal operation.

Fig. 9 represents an illustrative control system which embodies mechanism of the type described. That mechanism is indicated schematically at 20, with alternator 50, shaft 40, slip rings 103, 104, 105, and 106, first switch mechanism comprising switches A and B, and second switch C. The braked wheel is indicated at 200, with driving connection 49 to shaft 40 and with the brake indicated schematically at 202. That brake is represented illustratively as a hydraulic brake, and is connected to a source of hydraulic pressure by the conduit 204. The normal brake control is shown schematically at 206, and typically comprises a source of fluid under pressure and means under manual control, as by the hand lever 207, for admitting such pressurized fluid to pressure line 208 to apply the brake, or for releasing pressure in that line to release the brake. Line 208 communicates with line 204 via the automatic control valve indicated schematically at 210. A low pressure return line 209 leads from valve 210 to control means 206.

Control valve 210 may comprise any suitable type of valve structure that provides the following described four valving conditions in response to energization of certain electrical circuits in a manner to be described. As schematically shown, the valve employs an axially movable valve member 213 which comprises spaced upper and lower pistons 211 and 212. Valve member 213 is yieldably urged upward toward its normal position as illustrated by means not explicitly shown; and is shiftable downwardly from that position by energization of the actuating solenoid coil 216. A holding coil 218 is so arranged that its energization interrupts that downward movement of the valve member at a first predetermined intermediate position. Release of the holding coil permits the movement to continue to fully actuated position of the valve. A second holding coil 220 is arranged to interrupt the upward movement of the valve member, which follows release of actuating coil 216, holding the valve member at a second intermediate position. Release of second holding coil 220 then causes the valve to return to normal condition.

In normal condition of valve 210, as illustrated, free fluid flow is permitted between lines 208 and 204, and the brake is fully controllable by handle 207. Return line 209 is cut off by lower piston 212. In the described first intermediate position of the valve, upper piston 211 cuts off pressure line 208, preventing further increase of brake pressure; and lower piston 212 opens a restricted passage to return line 209, as via a groove of predetermined size indicated at 214. Restricted flow through that passage causes the brake pressure in line 204 to decrease at a predetermined limited rate.

In fully actuated position of valve 210, pressure line 208 is fully cut off and return line 209 is fully open, releasing the brake pressure. In the described second intermediate valve position, the valve member is typically slightly higher than in the first intermediate position, cutting off return line 209 and opening a restricted passage to pressure line 208, as via the groove 215 in upper valve piston 211. In that valve position, brake pressure metered by handle 207 can reach the brake only at a limited rate determined by the detailed design of the valve structure.

In the present illustrative system, direct current electric power is supplied from any suitable source 218 via the main switch 220. When that switch is open the entire control system is idled, and brake 202 is manually controllable in the normal manner by handle 207. With switch 220 closed, positive voltage is applied to main line 222 and also via line 223 to slip ring 103 and to one terminal of alternator 50. Negative power is applied to main line 224. Holding coil 218 is controlled by the normally closed switch 226 of holding relay 228, and is normally energized. Actuating coil 216 is controlled via line 217 by the normally open switch 230 of actuating relay 232. Relay 232 has its coil connected between line 224 and a line 233 which leads to slip ring 105, and is therefore actuated whenever switch A of first switch structure 130 is closed. That occurs typically in response to a first degree of wheel deceleration, which may be relatively slight. The resulting energization of actuating coil 216 shifts valve 210 to its first intermediate position, checking brake application and gradually reducing the brake pressure. That is often sufficient to prevent a skid.

Holding relay 228 has its coil connected between line 224 and a line 229, which leads to slip ring 104. That relay is therefore actuated whenever second switch C is closed. Holding coil 218 is thereby opened, fully actuating valve 210 and releasing the brake. That occurs in response to a greater degree of wheel deceleration, typically involving rotation of the flywheel through an angle of approximately 20 to 30 degrees with respect to shaft 40. That action positively prevents the wheel from developing an actual skid, even in those instances in which the milder control action of switch A has proved insufficient.

Second holding coil 220 is connected between lines 222 and 224 via the line 221 and normally open switch 242 of the recovery relay 240. The winding of that relay is connected via the line 243 between negative line 224 and slip ring 106, so that the relay is actuated upon closure of switch B in response to wheel acceleration. A time delay circuit is preferably provided for relay 240, shown as the capacitor 244 and resistance 245 series connected in shunt to the relay coil. A relay energizing connection is also provided via the unidirectional device 246 and normally open switch 230 of actuating relay 232, already described. Device 246 prevents energization of actuating coil 216 via acceleration switch B or by discharge of capacitor 244.

With that illustrative control of holding coil 220, the coil is energized via relay 240 by closure of switch A at the initiation of anti-skid action, but is ineffective at that time. After the skid has been brought under control, whether by the first stage of brake relief or by full release of the brakes, holding relay 240 remains actuated via its time delay circuit and then via closure of acceleration switch B throughout the period of wheel acceleration. After return of the wheel to normal speed, switch B opens. Relay 240 remains actuated via its time delay circuit for a predetermined time period, typically 0.3 to 0.5 second. Throughout that period of wheel recovery valve 210 is maintained in its second intermediate condition, with brake pressure supplied to the brake only at a predetermined limited rate. That limited supply of brake pressure can safely be initiated at an early stage of the wheel recovery, long before it would be feasible to resupply full pressure to the brake. It is thus possible to obtain useful braking action during a period when full brake application is likely to initiate a further skid.

Fig. 9 also includes means for relieving the brake if the wheel should become locked for a sufficient period of time to stop the flywheel and thus permit switches A and C to open. That locked wheel control is exercised by switch 234 of relay 236. When wheel 200 is rotating, alternator 50 produces on line 238 a voltage that alternates about that of positive line 223, causing the transistor 248 to become alternately conductive and nonconductive for current flow from positive line 222 via the emitter-collector circuit of the transistor and the resistor 244 to negative line 224. A substantially square wave voltage is thereby developed across resistor 244 and is applied via the capacitor 246 to one terminal of the rectifying bridge 250. The resulting direct current is supplied via the lines 252 and 254 to the coil of relay 236, maintaining the relay normally in actuated condition. The function of relay switch 234 in actuated position will be described below. When wheel 200 stops rotating, or, more precisely, when its rate of rotation drops below some critical value which is typically from 5 to 30 r.p.m., relay 236 is released. Capacitor 256 may be connected in shunt to the relay coil to delay that release for a definite time period.

For the present description, the armature of relay switch 234 may be considered to be connected via line 258 directly to positive line 222. Release of relay 236 then applies a positive voltage via the line 256 and the unidirectional conductive device 260 to the coil of holding relay 228. Holding solenoid coil 218 is thereby opened at switch 226, while actuation of that switch also applies positive voltage via the line 262 and line 233 to the coil of actuating relay 232, energizing actuating solenoid coil 216. The brake is thus fully released, regardless of the positions of the inertia switches A, B, and C. When the rate of wheel rotation again exceeds a definite critical value, relay 236 is again actuated, opening line 256 at switch 234. Actuation of relay 228 is preferably maintained for a short period, as by current supplied via rectifier 260 from the capacitor 266 and series resistor 267, which are connected in shunt to the relay winding. Such delayed release of relay 228 may be obtained if desired during operation by deceleration responsive switch C as well as during operation by alternator 50, for example by connecting capacitor 266 to the junction of line 229 and the relay coil rather than to line 256 as shown.

Whereas it is desirable that the brakes be released as just described on any wheel that becomes locked during landing, once the aircraft has been brought substantially to a stop normal brake action should become automatically available. That is desirable, for example, in case the pilot should neglect to open main switch 220. That may be accomplished by connecting line 258 to the source of positive voltage via a switch which is normally closed but becomes open when the aircraft is at rest. That is accomplished in the present system by connecting the normally open contact of relay switch 234 via the line 264 to positive line 222; and the switch armature via line 258 to a bus, indicated at 258a, which is also connected to the corresponding switch armature in the control system for each of the other wheels of the aircraft. Then, so long as one wheel is turning faster than the critical speed mentioned above, relay switch 234 for that wheel will be actuated, applying positive voltage to bus 258a via the line 264. When all wheels are at rest, bus 258a is open, and the locked wheel control is inoperative.

It is further desirable that, so long as the aircraft is airborne, the locked wheel control shall remain operative and release the brake on any locked wheel even if all wheels are locked. That is accomplished in the present system by means of the landing gear switch, indicated schematically at 270, which is closed when the aircraft is in the air and opens substantially at touchdown. Switch 270 controls the coil of relay 274, closing the switch 276 of that relay when the aircraft is airborne, and thereby applying positive voltage to bus 258a.

Gradual reapplication of braking pressure under control of holding coil 220 may be obtained, if preferred, without employing an acceleration signal. For example, holding coil 220 may be energized initially under direct control of relay 232, which controls valve actuating coil 216; and may be provided with a time delay circuit which maintains effective energization of the holding coil for a predeterminated time period following release of the actuating coil. More specifically, line 221 of Fig. 9 may be connected to the junction of capacitor 244 and rectifier 246. Relay 240 and line 243 may then be omitted entirely. Capacitor 244 and resistor 245 are selected to provide the desired time delay in release of coil 220, a delay period of 0.4 to 0.8 second being illustrative.

With that alternative control of holding coil 220, acceleration switch B of the inertial mechanism may be omitted if desired, together with brush 116 and slip ring 106. Alternatively, switch B may be connected in parallel with switch A. The latter arrangement has the effect of maintaining brake relief (whether partial relief via switch A or full release via switches A and C) during the wheel acceleration that follows recovery from the skid. The gradual reapplication of the brake under control of holding coil 220 then starts only after acceleration switch B opens. In brake systems in which the brake pressure can be increased quite rapidly without danger of overshooting, that arrangement offers great advantages over control systems that reapply the brake pressure substantially instantaneously. However, for most systems it is preferred to initiate gradual reapplication of the brakes during the wheel acceleration phase, in the manner provided illustratively by the system shown in Fig. 9.

I claim:

1. Mechanism responsive to deceleration of a braked wheel and comprising in combination, a first member rotatable about a member axis and normally driven in substantial accordance with the wheel rotation, an inertially driven second member rotatable about the member axis, stop means limiting the relative rotation of the members to an angular range of movement between two predetermined limit positions, a switch element mounted for pivotal movement between two angular positions with respect to one of the members, spring means connected between the other member and the switch element and exerting upon the switch element a yielding torque that changes direction as the members pass from one limit position to the other, causing the switch element to shift abruptly between its two positions in response to relative movement of the members between respective corresponding limit positions, and structure forming a switch which is open in one position of the switch element and closed in the other position thereof.

2. Mechanism as defined in claim 1 and including also releasable locking means for positively locking the switch element substantially in at least one of its said positions, said locking means being releasable in response to movement of the members away from their corresponding limit position.

3. Mechanism as defined in claim 1 and including also structure forming an abutment movable between a locking position in which it locks the switch element in one of its said positions and a releasing position, and means for shifting the abutment between its said positions in response to relative movement of the members.

4. Mechanism as defined in claim 1 and including also structure forming interengageable surfaces on said other member and on the switch element, respectively, engagement of said surfaces confining the switch element to each of its positions when the members are in their respective corresponding limit positions.

5. Mechanism responsive to deceleration of a braked wheel and comprising in combination a driving member and an inertially driven member rotatable about a common member axis, structure normally driving said driving member in substantial accordance with the wheel rotation, a switch element mounted for pivotal movement with respect to one of said members about a pivot axis parallel to the member axis between first and second angular positions, structure forming first and second spring supports mounted at predetermined positions with respect to the other member and to the switch element, respectively, said spring supports being radially offset from the member axis and from the pivot axis, respectively, and defining a plane parallel to said axes, stop means limiting the relative rotation of the members to the angular range between two predetermined limit positions such that the pivot axis lies on opposite sides of said plane when the members are in their respective limit positions, spring means connected between the spring supports and prestressed to exert on the second spring support a yielding force parallel to said plane and in the direction of the pivot axis, and structure forming an electrical switch which is open in one angular position of the switch element and closed in the other angular position thereof.

6. Mechanism as defined in claim 5, and in which the pivot axis is offset from the member axis, and the member axis lies on the same side of said plane throughout the range of relative angular movement of the members.

7. Mechanism as defined in claim 5, and in which the pivot axis is radially offset from the member axis, the first spring support lying on the side of the member axis away from the pivot axis, and the second spring support lying on the side of the pivot axis away from the member axis.

8. Mechanism responsive to deceleration of a braked wheel and comprising in combination a driving member and an inertially driven member rotatable about a common member axis, structure normally driving said driving member in substantial accordance with the wheel rotation, a switch element mounted for pivotal movement with respect to one of said members about a pivot axis parallel to the member axis and offset therefrom, said axes defining a pivot plane, stop means limiting the pivotal movement of the switch element to a definite angular range which extends between a normal switch position and an actuated switch position, structure forming an electrical switch which is open in one position of the switch element and is closed in the other position thereof, stop means limiting the relative rotation of the members to a definite angular range which extends between a normal position and an actuated position, and spring means acting between the other member and the switch element and exerting respective torques thereupon, the torque upon the switch element being directed toward the normal position thereof when the members are in their normal position, and being directed toward the actuated position thereof when the members are in their actuated position.

9. Mechanism as defined in claim 8, and in which the torque acting on the other member is always in a direction to move it toward normal position relative to said one member.

10. Mechanism as defined in claim 8, and in which the spring means comprises structure forming first and second spring supports mounted at predetermined positions with respect to the other member and to the switch element, respectively, said spring supports being radially offset from the member axis and from the pivot axis, respectively, and defining a spring plane parallel to said axes, the pivot axis lying on one side of said spring plane when the members are in normal position and lying on the other side of the spring plane when the members are in actuated position, and spring means connected between said spring supports and prestressed to exert upon the second spring support a yielding force parallel to the spring plane and in the direction of the pivot axis.

11. Mechanism as defined in claim 10 and in which the member axis is spaced on the same side of the spring plane throughout the range of relative movement of the members.

12. Mechanism as defined in claim 11 and in which the distance from the member axis to the spring plane is less in actuated position of the members than in normal position of the members.

13. Mechanism responsive to deceleration of a braked wheel and adapted to produce a plurality of successive electrical signals in response to respective degrees of wheel deceleration, said mechanism comprising in combination a shaft driven in substantial accordance with the wheel rotation, an inertially driven member journaled on the shaft axis, a switch member journaled on the shaft axis, one resilient means connecting the shaft and the switch member and defining a normal relative rotational relation therebetween, another resilient means connecting the switch member and the inertially driven member and defining a normal relative rotational relation therebetween, each of said resilient means being yieldable through a limited angle in response to a predetermined degree of wheel deceleration, and first and second circuit means for producing respective electrical signals in response to successive yielding of the two said resilient means.

14. Mechanism responsive to deceleration of a braked wheel and adapted to produce a plurality of successive electrical signals in response to respective degrees of wheel deceleration, said mechanism comprising in combination a first member rotatable about a member axis and normally driven in substantial accordance with the wheel rotation, an inertially driven second member rotatable about the member axis, a coupling element rotatably mounted with respect to said members, first resilient means connecting the coupling element with one of the members and defining a normal relative rotational relation therebetween, said first resilient means being yieldable through a first angle in response to a first rate of wheel deceleration, second resilient means connecting the coupling element with the other member and defining a normal relative rotational relation therebetween, said second resilient means being yieldable through a second angle in response to a second rate of wheel deceleration, the first angle being smaller than the second, and the first rate of wheel deceleration being smaller than the second, and first and second circuit means for producing respective electrical signals in response to successive yielding of the first and second resilient means.

References Cited in the file of this patent

UNITED STATES PATENTS

| | | |
|---|---|---|
| 1,847,764 | Kindl | Mar. 1, 1932 |
| 2,160,191 | Fitch | May 30, 1939 |
| 2,489,688 | Vitoux | Nov. 29, 1949 |
| 2,737,550 | Lucien | Mar. 6, 1956 |
| 2,830,147 | Thomson | Apr. 8, 1958 |
| 2,854,539 | Ruppel | Sept. 30, 1958 |
| 2,863,961 | Bonnell et al. | Dec. 9, 1958 |